July 8, 1969 — J. F. KOPCZYNSKI — 3,453,898
SPINDLE MOUNT FOR ROTARY AND AXIALLY MOVING TOOL
Filed Oct. 9, 1967 — Sheet 1 of 2
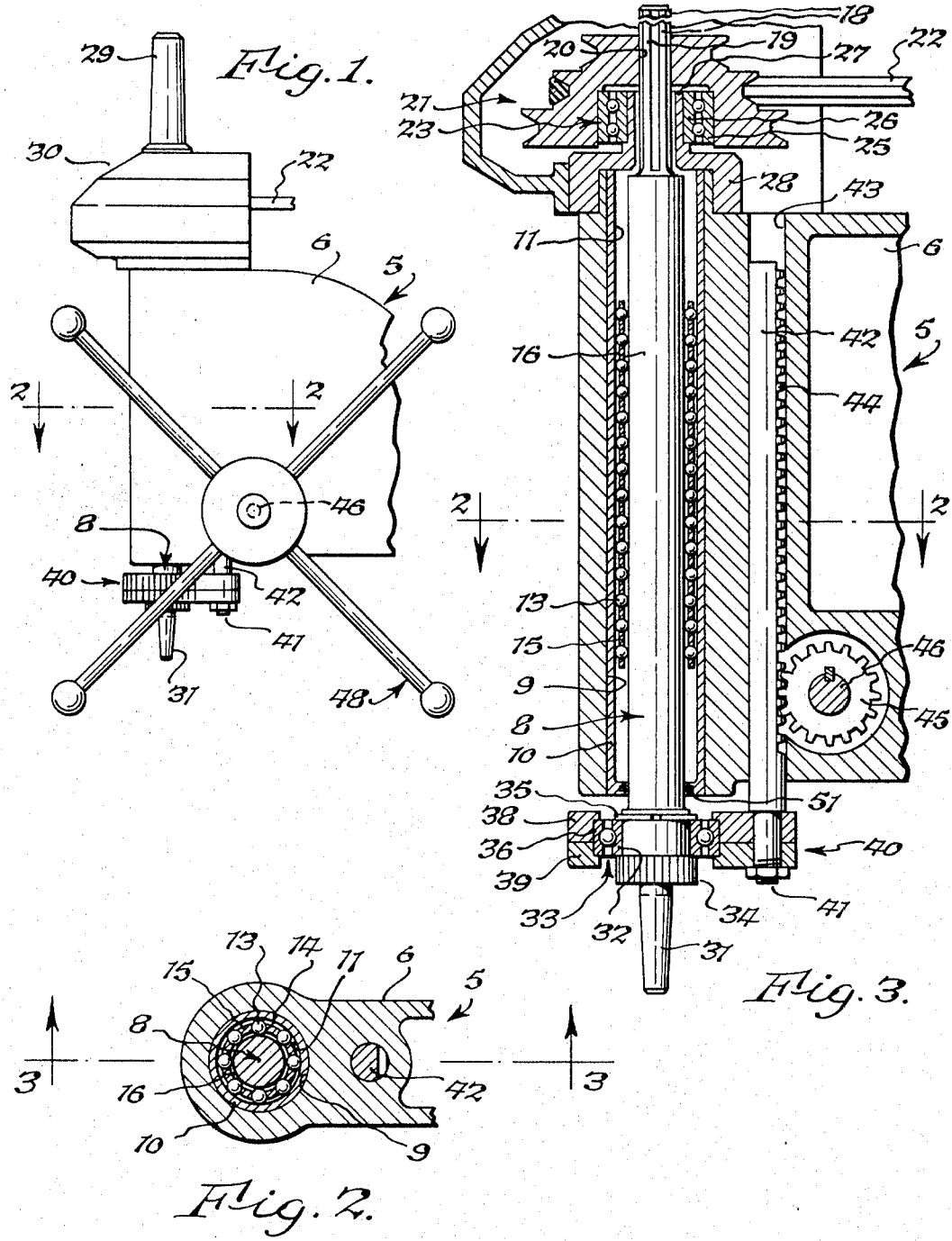
INVENTOR.
John F. Kopczynski
BY
Popp and Sommer
ATTORNEY.

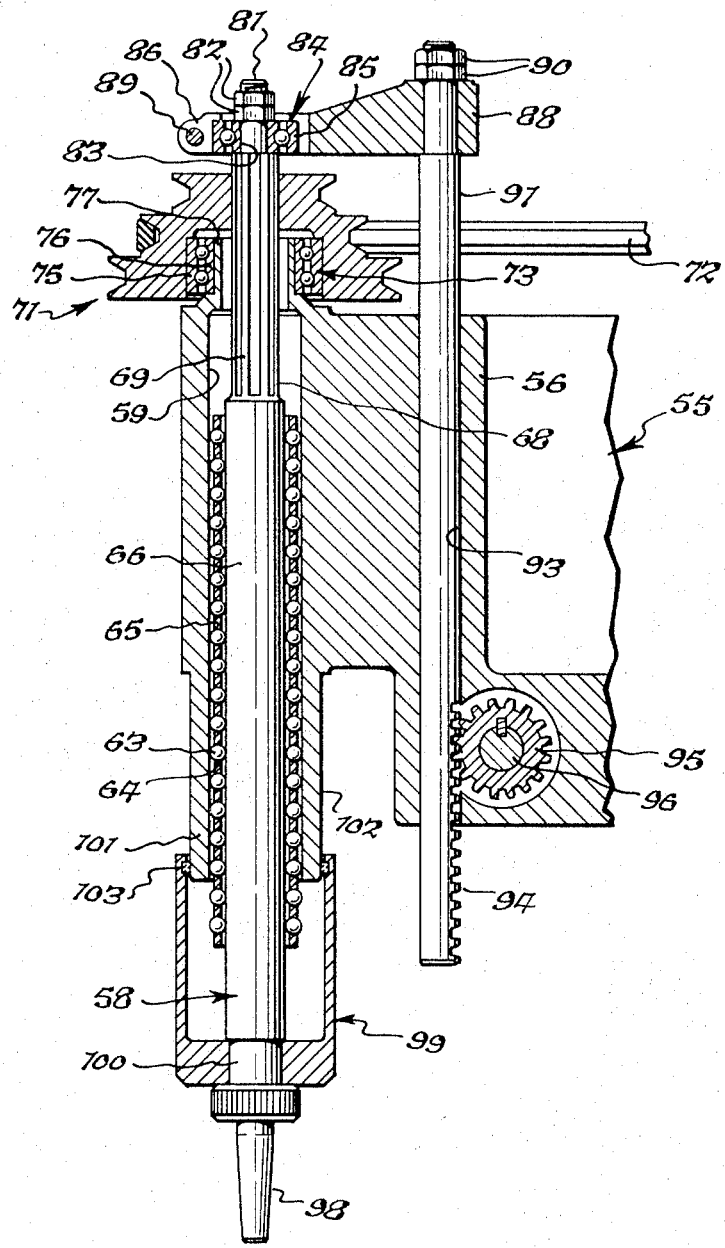

United States Patent Office 3,453,898
Patented July 8, 1969

3,453,898
SPINDLE MOUNT FOR ROTARY AND AXIALLY MOVING TOOL
John F. Kopczynski, 1671 Sweeney Place, North Tonawanda, N.Y. 14150
Filed Oct. 9, 1967, Ser. No. 673,892
Int. Cl. F16h *21/46;* B23b *47/18;* F16c *19/18*
U.S. Cl. 74—109          7 Claims

ABSTRACT OF THE DISCLOSURE

To support the spindle for a rotary and axially movable tool, as in drill presses, boring heads, grinders and the like, a rugged and accurately centering mount is provided by a multiplicity of axially and circumferentially spaced ball bearings interposed, and preferably preloaded, between an elongated cylindrical surface on the spindle, forming the inner race, and the concentric cylindrical bearing surface of an open-ended bore in the stand, forming the outer race. A ball retaining sleeve, with radial through holes for the ball bearings, holds the ball bearings in properly spaced relation to one another.

---

This provides a simple and accurate substitute for the quills and other complications in present spindle mounts for such tools, the invention being specifically illustrated in conjunction with a drill press, although the invention is not limited to such use, and is applicable for use with any spindle which is moved axially while rotating.

In the accompanying drawings FIG. 1 is a fragmentary side elevation of the head of a drill press stand showing a spindle mounted in its fully raised position in accordance with one form of the present invention. FIG. 2 is an enlarged horizontal fragmentary section taken generally on lines 2—2, FIGS. 1 and 3. FIG. 3 is a fragmentary vertical enlarged section taken generally on line 3—3, FIG. 2 with the spindle fully raised. FIG. 4 is a view similar to FIG. 3 and showing a modified form of the invention with the spindle fully lowered.

The drill press is shown as having a stand 5 including a head 6 carrying the spindle 8 mounted in accordance with the present invention. The spindle is arranged concentrically in a vertical bore 9 through the head 6 of the stand 5 and which is shown as lined with a sleeve 10 providing an internal cylindrical bearing surface 11 which is concentric with the spindle 8. This sleeve forms the outer race for a plurality of ball bearings 13 severally contained in openings 14 extending radially through an axially elongated ball retaining sleeve 15, these openings and ball bearings being arranged in spaced relation to one another both longitudinally and circumferentially of the ball retaining sleeve 15.

The inner race for the ball bearings 13 is the vertically elongated cylindrical periphery 16 of the central part of the spindle 8 which periphery in the upper most position of the spindle illustrated in FIG. 3 extends substantially the full length of the lining sleeve 10. The ball bearings 13 are preferably preloaded to hold the spindle 8 accurately in centered relation, that is, they are in pressure contact with both the internal surface 11 of the sleeve 10 and also the cylindrical periphery 16 of the central part of the spindle 8. The mounting of these ball bearings in the ball retaining sleeve 15 permits both rotary and also axial movement of the spindle 8, the ball retaining sleeve 15 traveling axially half as fast and half the distance of the spindle 8.

Means are provided for rotating the spindle 8 while at the same time permitting it to be moved axially, these means being preferably constructed as follows:

The numeral 18 represents the upper reduced end of the spindle 8 which end projects upwardly out of the bearing surface 11 of the sleeve 10 and is longitudinally fluted to provide longitudinal splines 19 thereon. These longitudinal splines mate with axial splineways 20 provided in the bore of a rotor in the form of a three-step pulley 21. This pulley is driven by a horizontal V-belt 22 and is supported by a double acting or double step thrust ball bearing 23, the outer race 25 of which is fixed within the pulley. The inner race 26 of this thrust ball bearing 23 is fixed to the exterior of a neck 27 projecting upwardly from a hub 28 mounted on the stand 5 around the upper end of the sleeve 10 and through which the fluted upper end 18 of the spindle 8 extends. This fluted upper end 18 can be enclosed in a guard 29 and the pulley 21 enclosed in a guard 30, both mounted on the head 6 of the stand 5 as illustrated in FIG. 1.

The lower end of the spindle 8 projects downwardly below the sleeve 10 and is tapered, as indicated at 31, for application of a conventional drill bit chuck (not shown). Above this taper the inner race 32 of double acting or double step thrust ball bearing 33 is fixed to the spindle between a head 34 and a split ring 35. The outer race 36 of this double acting thrust bearing 33 is held between the halves 38 and 39 of a two-piece holder 40 which are bolted together by the lower reduced end 41 of a vertical bar in the form of a rack 42 slidingly mounted in a slideway 43 in the stand 5, and which slideway is arranged parallel with the spindle 8. The teeth 44 of this rack 42 mesh with a pinion 45 keyed to a horizontal shaft 46 suitably journalled in the stand 5 and projecting outwardly therefrom. Externally of the stand a four-armed manual actuator 48 is fixed thereto.

A dust and dirt seal 51 is provided between the lower end of the spindle 8 and the sleeve 10 to protect the bearing surfaces 11 and 16 against work which the ball bearings 13 work.

In the operation of the form of the invention shown in FIGS. 1–3 the pulley 21, driven by the V-belt 22, rotates the upper splined end 18 of the spindle 8 which is held in accurately centered relation to the cylindrical bearing surface 11 by the ball bearings 13 which are preloaded or in pressure contact with this bearing surface 11 and with the cylindrical periphery 16 of the spindle to maintain a high degree of accuracy in centering the spindle. This rotates the drill bit fixed to the tapered lower end 31 of the spindle 8 by a chuck (not shown).

To move the rotating drill downwardly into the workpiece, the operator turns the four-armed actuator 48 counterclockwise as viewed in FIG. 1 thereby to turn its shaft 46 and the pinion 45 in a corresponding direction. Through the teeth 44, this moves the rack 42 downwardly in its slideway 43, and through the holder 40 for the outer race 36 of the double acting thrust ball bearing 33, and through this thrust bearing 33, moves the spindle 8 downwardly. This movement is permitted by the ball bearings 13 contained in their ball retaining sleeve 15, this sleeve also moving downwardly half as fast and half the distance of the spindle 8.

In the form of the invention illustrated in FIG. 4, the drill press is shown as having a stand 55 including a head 56 carrying the spindle 58 arranged concentrically in a vertical bore 59 through the head 56 of the stand 55 and which provides an internal cylindrical bearing surface which is concentric with the spindle 58. This surface 59 forms the outer race for a plurality of ball bearings 63 severally contained in openings 64 extending radially through an axially elongated ball retaining sleeve 65, these openings and ball bearings being arranged in spaced relation to one another both longitudinally and circumferentially of the ball retaining sleeve 65.

The inner race for the ball bearings 63 is the vertically elongated periphery 66 of the central part of the spindle 58 which periphery, in the uppermost position of the spindle, extends substantially the full length of the bore 59. The ball bearings 63 are preferably preloaded to hold the spindle 58 accurately in centered relation, that is, they are in pressure contact with both the bore 59 and also the cylindrical periphery 66 of the central part of the spindle 58. The mounting of these ball bearings in the ball retaining sleeve 65 permits both rotary and also axial movement of the spindle 58, the ball retaining sleeve 65 traveling axially half as fast and half the distance of the spindle 8.

Means are provided for rotating spindle 58 while at the same time permitting it to be moved axially. These means being preferably constructed as follows:

The numeral 68 represents the upper reduced end of the spindle 58 which end projects upwardly out of the bore 59 and is longitudinally fluted to provide longitudinal splines 69 there on. These splines mate with axial splineway provided in the bore of a rotor in the form of a three-step pulley 71. This pulley is driven by a horizontal V-belt 72 and is supported by a double acting or double step thrust ball bearing 73, the outer race 75 of which is fixed within the pulley. The inner race 76 of this thrust ball bearing 73 is fixed to the interior of a neck 77 projecting upwardly forming the stand 55 concentric with the bore 59 and through which the fluted upper end 68 of the spindle 58 extends.

The extreme upper end of the spindle 68 is of reduced tthreaded form, as indicated at 81, and nuts 82 secure the inner race 83 of a double acting or double step thrust ball bearing 84 to this upper threaded end 81 of the spindle 58. The outer race 85 of this double acting thrust ball bearing 84 is held between the clamping jaws 86 of a holder 88, these jaws 86 being brought into clamping engagement with the outer race 85 by a clamping bolt 89. The holder 88 is secured by nuts 90 to the upper end of a vertical bar in the form of a rack 91 slidingly mounted in a slideway 93 in the stand 55, and which slideway is arranged parallel with the spindle 58. The teeth 94 of this rack 91 mesh with a pinion 95 keyed to horizontal shaft 96 suitably journalled in the stand 55 and projecting outwardly therefrom. As with the form of the invention shown in FIGS. 1–3 a four-armed manual actuator (not shown) can be fixed to an outboard end of this shaft.

The lower end of this spindle projects downwardly below the bore 59 and is tapered, as indicated at 98, for application of a conventional drill bit chuck (not shown). Above this taper a cylindrical cup-shaped protector 99 is mounted on the lower end of the spindle, preferably so that the spindle 58 can rotate relative to this cup-shaped protector 99, the protector having a rotary connection with a reduced cylindrical portion 100 of the spindle 58 for this purpose. The cup-shaped cylindrical protector 99 is of substantial depth and its walls embrace a cylindrical neck 101 integral with and projecting downwardly from the stand 55, the interior of this neck providing a continuation of the bore 59 and the exterior being in the form of a concentric cylindrical face 102 along which the upstanding wall of the cup-shaped protector 99 moves up and down. Preferably an annular dust seal 103 is provided at the upper end of the cup-shaped protector 99 and slides longitudinally along the cylindrical face 102.

In the operation of the form of the invention shown in FIG. 4 the pulley 71, driven by the belt 72, rotates the upper splined end 68 of the spindle 58 which is held in accurately centered relation to the cylindrical bearing surface or bore 59 by the ball bearings 63 which are preloaded or in pressure contact with this bearing surface 59 and with the cylindrical periphery 66 of the spindle 58 to maintain a high degree of accuracy in centering the spindle. This rotates the drill bit fixed to the lower tapered end 98 on the spindle 58 by a chuck (not shown).

To move the rotating drill downwardly into the workpiece, the operator, through an actuator (not shown), turns the shaft 96 and pinion 95 clockwise. Through the teeth 94, this moves the rack 91 downwardly in its slideway 93, and through the holder 88 for the outer race 85 of the double acting thrust ball bearing 84, and through this thrust bearing 84, moves the spindle 58 downward. This movement is permitted by the ball bearings 63 contained in their ball retaining sleeve 65, this sleeve also moving downwardly half as fast and half the distance of the spindle 58.

It will be noted that with the form of the invention shown in FIG. 4 the ball retaining sleeve moves outwardly from the bottom of the bore 59 when the spindle 58 is moved toward its extreme bottom position illustrated in FIG. 4. This lower protruding end of this ball retaining sleeve 65 is protected by the cup-shaped protector 99 which also serves to support the dust seal 103. This is in contrast to the form of the invention shown in FIGS. 1–3 where the ball retainer sleeve 15 always remains within the bore 11 and hence permits the stationary dust seal 51 to be employed.

With both forms of the invention accurately centered rotary and axial movement of the spindle is provided by the simple ball retaining sleeve and its multiplicity of balls which are interposed directly between a cylindrical periphery on the spindle and a bore in the stand providing the companion cylindrical bearing surface. This eliminates many of the complications, including the conventional quill, which form a part of the present drill press spindle mounts. As previously indicated, the invention is not limited to use in a drill press, but is applicable wherever a spindle is moved axially while rotating.

I claim:

1. A tool spindle mounting construction comprising an housing, an open-ended bore in said housing defining a cylidrical bearing surface, a spindle having a central portion located in said bore and opposite end portions extending beyond said bore, a first ball bearing assembly including a free floating ball bearing retaining sleeve interposed concentrically between said spindle and said bearing surface for a substantial portion of the length of said bore and a plurality of ball bearings mounted in said sleeve and extending both substantially throughout the length of the sleeve and circumferentially thereof for engaging both said spindle and said bearing surface for maintaining said spindle in centered relationship in said bore while permitting both rotary and axial movement thereof, a drive pulley mounted on said housing, a splined connection between said pulley and one of said end portions of said spindle outside of said bore for providing a rotary driving relationship between said pulley and said spindle while permitting relative axial movement between said spindle and said pulley, a second ball bearing assembly including a ball thrust bearing mounted on said spindle in spaced relationship to said first ball bearing assembly and including an outer race and inner race mounted against axial movement on said spindle, a bar mounted for sliding movement in said housing in parallel relationship to said spindle, linkage means attached to said bar and coupled to said second ball bearing assembly to transmit axial movement to said spindle while permitting rotary movement of said spindle, and means for imparting axial movement to said bar, said first and second ball bearing assemblies essentially constituting the sole areas in which said spindle is supported for rotation and axial movement except for said splined connection.

2. A tool spindle mounting construction as set forth in claim 1 wherein said linkage means attached to said bar are coupled solely to said outer race of said second ball bearing assembly to transmit axial movement to said spindle solely through said second ball bearing assembly.

3. A tool spindle mounting construction as set forth in claim 2 wherein said opposite end portions of said spindle include a first end portion for mounting a tool, and wherein said second bearing assembly is mounted on said first end portion, whereby said bar and said linkage stabilize said first end portion of said spindle.

4. A tool spindle mounting construction as set forth in claim 1 wherein said opposite end portions of said spindle include a first end portion for mounting a tool, and wherein said first bearing assembly is of a sufficient length to have a portion thereof move axially out of said bore proximate said first end portion of said spindle to provide lateral support to said first end portion when said spindle is moved toward a workpiece.

5. A tool spindle mounting construction as set forth in claim 4 wherein said housing includes a lower portion proximate said first end portion of said spindle, an hollow protector having first and second ends, means mounting said first end of said hollow protector on said first end of said spindle for axial movement therewith, and dust seal means mounting said second end of said hollow protector for sliding movement on said lower portion of said housing, thereby maintaining said first bearing assembly protected as said first bearing assembly moves out of said bore axially toward said workpiece.

6. A tool spindle mounting construction comprising an housing, an open-ended bore in said housing defining a cylindrical bearing surface, a spindle having a central portion located in said bore and opposite end portions extending beyond said bore, a first ball bearing assembly including a ball bearing retaining sleeve interposed concentrically between said spindle and said bearing surface for a substantial portion of the length of said bore and a plurality of ball bearings mounted in said sleeve and extending both substantially throughout the length of the sleeve and circumferentially thereof for engaging both said spindle and said bearing surface for maintaining said spindle in centered relationship in said bore while permitting both rotary and axial movement thereof, a drive pulley mounted on said housing, a splined connection between said pulley and one of said end portions of said spindle outside of said bore for providing a rotary driving relationship between said pulley and said spindle while permitting relative axial movement between said spindle and said pulley, a second ball bearing assembly including a ball thrust bearing mounted on said spindle in spaced relationship to said first ball bearing assembly and including an outer race and inner race mounted against axial movement on said spindle, a bar mounted for sliding movement in said housing in parallel relationship to said spindle, linkage means attached to said bar and coupled to said second ball bearing assembly to transmit axial movement to said spindle while permitting rotary movement of said spindle, means for imparting axial movement to said bar, said first and second ball bearing assemblies essentially constituting the sole areas in which said spindle is supported for rotation and axial movement except for said splined connection, said opposite end portions of said spindle including a first end portion for mounting a tool, and said first bearing assembly being of a sufficient length to have a portion thereof move axially out of said bore proximate said first end portion of said spindle to provide lateral support to said first end portion when said spindle is moved toward a workpiece.

7. A tool spindle mounting construction as set forth in claim 6 wherein said housing includes a lower portion proximate said first end portion of said spindle, an hollow protector having first and second ends, means mounting said first end of said hollow protector on said first end of said spindle for axial movement therewith, and dust seal means mounting said second end of said hollow protector for sliding movement on said lower portion of said housing, thereby maintaining said first bearing assembly protected as said first bearing assembly moves out of said bore axially toward said workpiece.

References Cited

UNITED STATES PATENTS

| | | | |
|---|---|---|---|
| 1,433,387 | 10/1922 | Leckinger | 77—34.6 X |
| 2,215,681 | 9/1940 | Wilford et al. | 308—236 |
| 2,362,873 | 11/1944 | Wessman. | |
| 2,887,344 | 5/1959 | Hause | 77—34.6 X |

MILTON KAUFMAN, *Primary Examiner.*

U.S. Cl. X.R.

51—34; 77—34.6; 308—6